United States Patent
Zebrowski

(10) Patent No.: US 8,317,201 B2
(45) Date of Patent: Nov. 27, 2012

(54) DEVICE FOR A ROTATING GLAND SEAL

(75) Inventor: Jan Zebrowski, Sollentuna (SE)

(73) Assignee: Xylem IP Holdings LLC, White Plains, NY (US)

( * ) Notice: Subject to any disclaimer, the term of this patent is extended or adjusted under 35 U.S.C. 154(b) by 751 days.

(21) Appl. No.: 11/993,937

(22) PCT Filed: Jun. 5, 2006

(86) PCT No.: PCT/SE2006/000660
§ 371 (c)(1),
(2), (4) Date: Jul. 14, 2008

(87) PCT Pub. No.: WO2006/137766
PCT Pub. Date: Dec. 28, 2006

(65) Prior Publication Data
US 2008/0265519 A1 Oct. 30, 2008

Related U.S. Application Data

(60) Provisional application No. 60/693,017, filed on Jun. 22, 2005.

(51) Int. Cl.
*F16J 15/18* (2006.01)
*F16J 15/26* (2006.01)
(52) U.S. Cl. .................................... 277/510; 277/520
(58) Field of Classification Search ............... 277/390, 277/394–395, 397, 510, 520
See application file for complete search history.

(56) References Cited

U.S. PATENT DOCUMENTS

| | | | | |
|---|---|---|---|---|
| 2,863,512 | A * | 12/1958 | Mansfield | 169/48 |
| 2,894,770 | A * | 7/1959 | Payne | 277/371 |
| 3,031,199 | A * | 4/1962 | Laser et al. | 277/397 |
| 3,214,182 | A * | 10/1965 | Herbruggen | 277/465 |
| 4,123,068 | A * | 10/1978 | Van Gorder | 277/436 |
| 4,594,938 | A * | 6/1986 | Shore | 92/82 |
| 4,814,651 | A * | 3/1989 | Elris et al. | 310/88 |
| 6,129,358 | A * | 10/2000 | Kiesel et al. | 277/436 |
| 6,264,204 | B1 * | 7/2001 | Nappini et al. | 277/391 |
| 6,311,813 | B1 * | 11/2001 | Lauderbach et al. | 188/322.18 |
| 6,328,312 | B1 | 12/2001 | Schmitz et al. | |
| 6,392,322 | B1 * | 5/2002 | Mares et al. | 310/88 |
| 6,523,833 | B1 * | 2/2003 | Ishigaki et al. | 277/650 |
| 6,580,189 | B2 * | 6/2003 | Mooney | 310/81 |
| 6,856,058 | B1 * | 2/2005 | Lipa | 310/81 |
| 6,896,269 | B2 * | 5/2005 | Jackson | 277/544 |

FOREIGN PATENT DOCUMENTS

| | | |
|---|---|---|
| DE | 1788231 U | 5/1959 |
| DE | 1160310 B | 12/1963 |
| DE | 1952320 A1 | 4/1971 |
| DE | 19532549 A1 * | 3/1997 |
| GB | 517781 A | 2/1940 |
| GB | 902452 A | 8/1962 |

* cited by examiner

*Primary Examiner* — Vishal Patel
(74) *Attorney, Agent, or Firm* — Browdy and Neimark, PLLC

(57) ABSTRACT

The present invention relates to a machine arranged to operate in explosive environments, comprising a rotatable shaft (16) extending through a stationary part (10) of said machine, a gland (20) which is mounted in said stationary part (10) and which is provided with a through hole in order to accommodate said rotatable shaft (16) such that a flame path is provided between the rotatable shaft (16) and the gland (20). The invention is characterized in that the machine comprises dampening means (42) arranged between and separates the gland (16) and the stationary part (10) in the axial and radial directions such that a flame path (50, 56) is provided, the dampening means (42) maintaining the flame path (50, 56) and permitting axial and radial movement of the gland (20) in relation to the stationary part (10) upon rotation of the rotatable shaft (16).

9 Claims, 3 Drawing Sheets

DEVICE FOR A ROTATING GLAND SEAL

TECHNICAL FIELD

The present invention relates to protective devices between the exterior and the interior of pumps, and in particular pumps that are to be used in explosive environments.

BACKGROUND OF THE INVENTION

For some applications there are requirements that the enclosure for electrical apparatuses is able to withstand an internal explosion of flammable gas or vapour that may enter it, without suffering damage and without communicating the internal flammation or sparks to the explosive atmosphere through any joints or structural openings. This is obtained by providing flame paths of sufficient strength and integrity to withstand internal explosions without communicating the internal flammation to the external flammable gas or vapour through these joints.

With pumps, one such structural joint is the passage of the drive shaft through the housing. One example of providing flame paths is to arrange a gland surrounding the pump shaft, which is mounted in the wall separating the motor side from the impeller side. The gland is designed as a metal cylinder surrounding the shaft arranged to provide flame paths between the shaft and the gland. The gland has a rather tight fit around the shaft. At the same time there must be space enough to form a film but not so tight that there is a risk for metallic contact. There is especially a risk for metallic contact when there are loads on the impeller causing the pump shaft to bend, in particular when the shaft protrudes quite a distance from the journal point.

The fixed mounting of the gland in the wall means that when the shaft bends there is a risk that it will come in contact with edge parts of the gland. This problem is even more pronounced with pumps that are intended to be used in an environment where explosive gases are present where requirements stipulate that the gap between the gland and the shaft has to have a minimum width and minimum length in order to ensure that no sparks from the motor can enter through the gap.

BRIEF DESCRIPTION OF THE INVENTION

The aim of the present invention is to remedy the above mentioned problems regarding protection of electrical apparatuses and in particular pumps working in explosive environments.

This aim is solved by a device according to claim 1. Preferable embodiments of the invention form part of the dependent patent claims.

According to a main aspect of the invention it is characterised in a machine arranged to operate in explosive environments, comprising a rotatable shaft extending through a stationary part of said machine, a gland which is mounted in said stationary part and which is provided with a through hole in order to accommodate said rotatable shaft such that a flame path is provided between the rotatable shaft and the gland, characterized in that the machine comprises dampening means arranged between and separates the gland and the stationary part in the axial and radial directions such that a flame path is provided, the dampening means maintaining the flame path and permitting axial and radial movement of the gland in relation to the stationary part upon rotation of the rotatable shaft.

According to another aspect of the invention, it is characterised in that the dampening means comprises a number discrete resilient members arranged against at least one surface of the gland and at least one surface of the stationary part, which surfaces are facing in the axial direction of the shaft.

According to a preferred embodiment, it is characterised in that one set of resilient members are arranged between a first surface of the gland and a first surface of the stationary part, which first surfaces are facing towards each other, and that another set of resilient members are arranged between a second surface of the gland, facing in the opposite direction as the first surface of the gland and a second surface of the stationary part, facing in the opposite direction as the first surface of the stationary part, which second surfaces are facing towards each other.

According to a further aspect of the invention, it is characterised in that the discrete resilient members are inter-connected and spaced at even intervals along a circumference around the shaft. Preferably the discrete members are formed such that they provide point contacts with said surfaces or line contacts with said surfaces.

According to yet an aspect of the invention, it is characterised in that said gland is arranged with a flange-shaped part having circumferential recesses for receiving said resilient members.

The benefits of the present invention are several. Due to the resilient dampening members the gland surrounding the shaft, with a rather tight fit, is able to move during rotation of the shaft. In this way, during any bending of the shaft, the movement of the gland is taken up by the resilient members. In this way the gland "floats", thereby reducing the risk of damaging the gland during heavy operation conditions.

Because the resilient members preferably are arranged as discrete members, an improved resiliency is obtained compared to a homogenous ring, such as an O-ring. As the discrete members preferably are arranged to provide a point contact or a line contact in the circumferential direction, a "rolling" action or movement is obtained in the radial direction of the gland.

To obtain a very flexible movement, the resilient members are arranged on both sides of a flange-shaped part of the gland.

These and other aspects of and advantages with the present invention will become apparent from the following detailed description and the accompanying drawings.

BRIEF DESCRIPTION OF THE DRAWINGS

In the following detailed description of the invention, reference will be made to the accompanying drawings, of which

DETAILED DESCRIPTION OF THE INVENTION

Figures 1, 2:
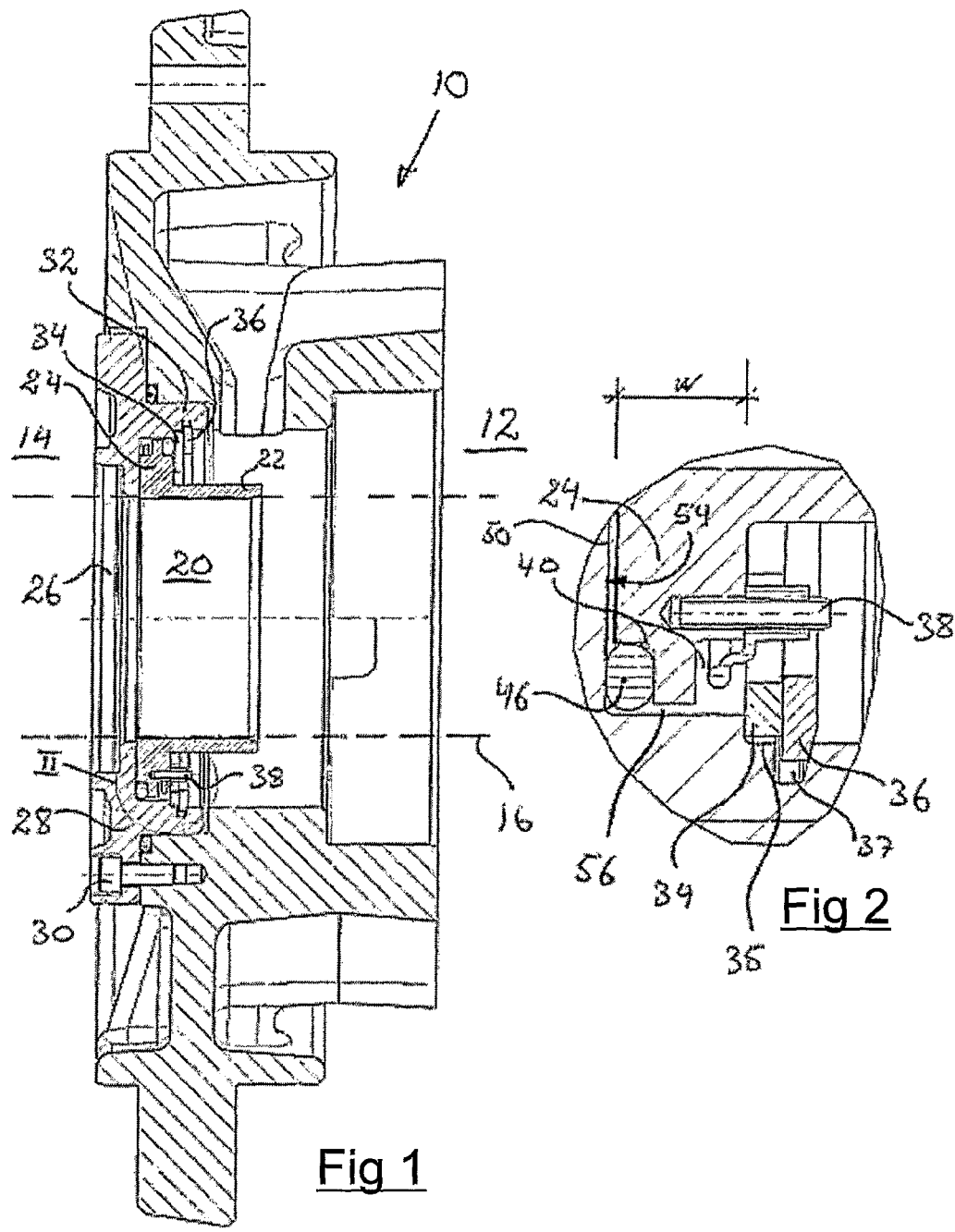
FIG. 1 is a view in cross-section of a pump part comprising the present invention.
FIG. 2 is a detailed view taken from the ring-marked area II of FIG. 1.

FIG. 1 shows a pump part 10, a dividing wall, between an interior 12 and an exterior 14 side of the pump to be used for example in explosive environments. It comprises a main pump shaft 16, shown with broken lines, running through a hole in the dividing wall. On the interior side an electrical motor (not shown) is connected to the shaft, or that the shaft constitutes the motor shaft. The shaft is journalled in bearings arranged in the housing.

At the entry passage of the shaft to the exterior side, a gland 20 is arranged, having a first cylindrical part 22 surrounding the shaft with a certain prescribed clearance between the shaft and the gland, thereby providing a flame path, and an outwardly flange-shaped part 24. The end surface of the flange-shaped part is adjacent a front surface 54, FIG. 2, of a mounting ring 26. The mounting ring is arranged with a flange 28 having a number of through-holes, into which bolts 30 are threaded into threaded holes in the dividing wall for attaching the mounting ring. The interior part of the mounting ring is arranged with a cylindrical part 32. The inner surface of the cylindrical part is arranged with a ledge 35 on which a spacer 34 is placed. The spacer is in turn held in position by a retainer ring 36 fitting into a groove 37 arranged adjacent the ledge. A movement limiting pin 38 is attached to a side surface of the flange-shaped part of the gland, which movement limiting pin 38 protrudes through a cut-out or the like in the spacer 34.

Figure 3:
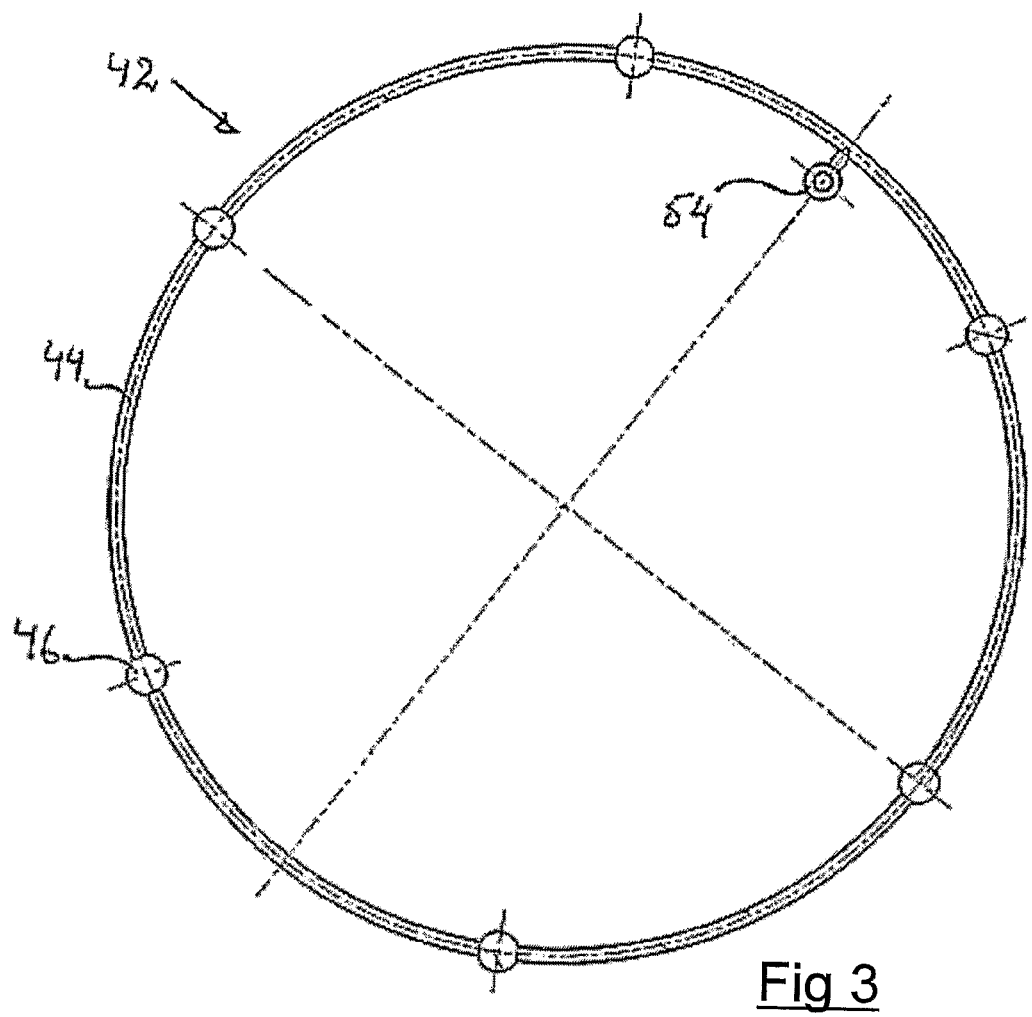
FIG. 3 is a top view of one embodiment of a dampening means according to the present invention.
Figure 4:
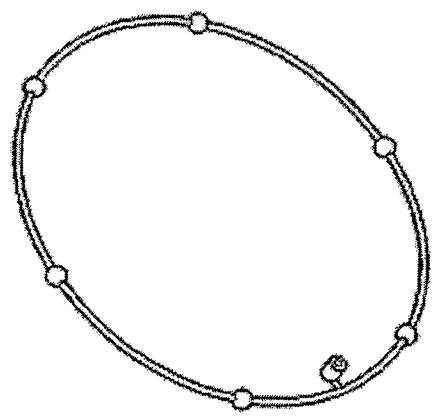
FIG. 4 is a perspective view of the dampening means shown in FIG. 3.

The flange-shaped part 24 of the gland is arranged with two circumferential grooves 40 at the edges of the flange-shaped part. In each of these grooves a dampening means 42 is arranged. One embodiment of the dampening means is shown in FIGS. 3 and 4. It is made of a resilient material such as rubber and is formed as a ring 44 having a cross-sectional diameter that is lesser than the width/depth of the space formed by the grooves 40 of the flange-shaped part and the end surface 54 of the mounting ring 26 and the spacer 34 respectively. Along the ring a number of discrete dampening members 46 are attached at even intervals. In the embodiment shown in FIGS. 3 and 4 the dampening members 46 are formed as spheres having a diameter that is somewhat larger than the width/depth of the above mentioned spaces. The width w, FIG. 2, of the flange-shaped part of the gland is such that when the gland is mounted, a gap 50 is created, functioning as a further flame path.

The function is that when the dampening means 42 are mounted in the circumferential grooves 40, the dampening members 46 are somewhat compressed by the flange-shaped part 24 of the gland and the spacer 34 held in place by the retainer ring 36. There is however the gap 50 between on the one hand the side surface of the flange-shaped part of the gland and the inner end surface 54 of the mounting ring and on the other hand a space 56 between the circumferential surface of the flange-shaped part of the gland and the mounting ring. The dampening members thereby permit a certain movement of the gland both in axial and radial direction. Thus any bending of the shaft during use results in a movement of the gland due to the dampening members. By this arrangement the gland is permitted to "float" somewhat during bending movement of the shaft, thereby minimizing the risk for metallic contact between the gland and the shaft and at the same time maintaining the prescribed gap or flame path between the two parts as well as the gap or flame path 50 between the gland and the mounting ring.

Figure 5:
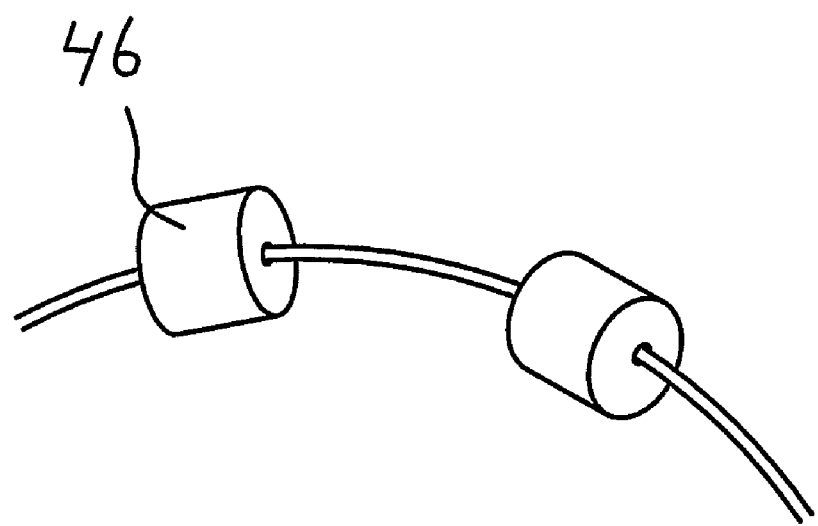
FIG. 5 shows variants of discrete resilient members of the present invention.
Figure 5:
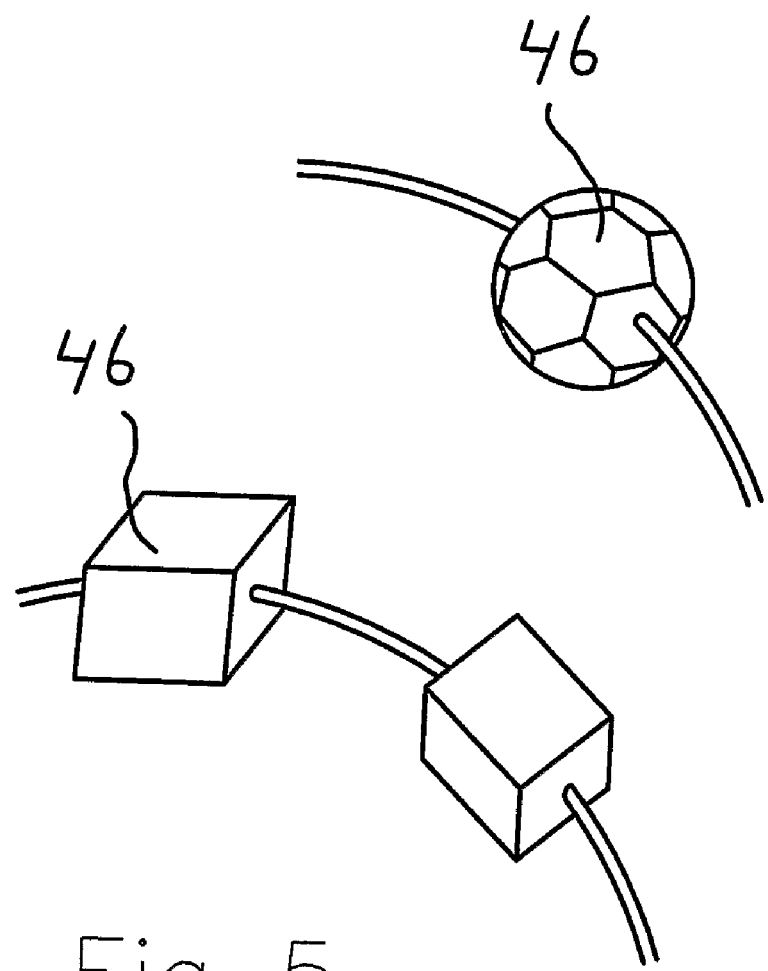

FIG. 5 shows that the dampening members may have other shapes than spheres, such as for example tubular or cylindrical, 48, polygons, 50 or even rectangular, 52, where the main function is to permit a certain movement of the gland in relation to the shaft and the dividing wall. The spacing between the dampening members as well as the elastic properties of the material of the dampening members may be varied depending on the desired function. There may also be different materials in the ring and the dampening members.

In order to avoid unnecessary friction between the pin 38 and the spacer 34 due to relative movement between the two, the dampening means is arranged with a tubular cover 56 that fits around the movement limiting pin 38.

It is to be understood that the embodiments of the invention that are described above and shown in the drawings only are to be regarded as non-limiting examples of the invention and that it may be modified in numerous ways within what is defined by the scope of the appended patent claims.

The invention claimed is:

1. A machine arranged to operate in explosive environments, comprising a rotatable shaft (16) extending through a stationary part (10) arranged between an interior side (12) and an exterior side (14) of said machine, a gland (20) which is mounted in said stationary part (10) and which is provided with a through hole in order to accommodate said rotatable shaft (16) such that a first flame path is provided between the rotatable shaft (16) and the gland (20), wherein the machine comprises dampening means (42) arranged between and separating the gland (20) and the stationary part (10) in the axial and radial directions such that a second flame path (50, 56) is provided between the gland (20) and the stationary part (10), the dampening means (42) maintaining the existence of the second flame path (50, 56), and the dampening means comprising an annular part (44) having discrete enlarged portions (46) arranged to contact the gland and stationary part, and permitting axial and radial movement of the gland (20) in relation to the stationary part (10) upon rotation of the rotatable shaft (16), said first and second flame paths extending from the interior side (12) to the exterior side (14).

2. The machine according to claim 1, wherein the enlarged portions comprise a number of discrete resilient members (46) arranged against at least one surface of the gland (20) and at least one surface of the stationary part (10), which surfaces are facing in the axial direction of the rotatable shaft (16).

3. The machine according to claim 2, wherein one set of resilient members (46) are arranged between a first surface of the gland (20) and a first surface of the stationary part (10), which first surfaces are facing each other, and that another set of resilient members are arranged between a second surface of the gland (20), facing in the opposite direction as the first surface of the gland (20) and a second surface of the stationary part (10), facing in the opposite direction as the first surface of the stationary part (10), which second surfaces are facing each other.

4. The machine according to claim 2, wherein the discrete resilient members (46) are inter-connected and spaced at even intervals along a circumference around the rotatable shaft (16).

5. The machine according to claim 2, wherein the discrete resilient members (46) are formed such that they provide point contacts with said surfaces of the gland (20) and the stationary part (10) or line contacts with said surfaces of the gland (20) and the stationary part (10).

6. The machine according to claim 1, wherein the machine comprises a locking means (38, 54) arranged to rotationally lock said gland (20) in relation to the stationary part (10) of the machine.

7. The machine according to claim 1, wherein the gland (20) is arranged with a flange-shaped part (24) having at least one circumferential recess (40) for receiving said dampening means (42).

8. The machine according to claim 1, wherein at least said second flame path is constituted by a gap dimensioned to prevent the passage of sparks or flame out of said machine.

9. The machine according to claim 1, wherein each of said flame paths is constituted by a gap dimensioned to prevent the passage of sparks or flame out of said machine.

* * * * *